US011471978B2

(12) United States Patent
Domoto et al.

(10) Patent No.: US 11,471,978 B2
(45) Date of Patent: Oct. 18, 2022

(54) LASER OSCILLATOR, LASER MACHINING DEVICE IN WHICH SAME IS USED, AND LASER OSCILLATION METHOD

(71) Applicant: Panasonic Intellectual Property Management Co., Ltd., Osaka (JP)

(72) Inventors: Shinya Domoto, Osaka (JP); Ryo Ishikawa, Osaka (JP); Naoya Kato, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 124 days.

(21) Appl. No.: 17/013,773

(22) Filed: Sep. 7, 2020

(65) Prior Publication Data

US 2020/0406403 A1 Dec. 31, 2020

Related U.S. Application Data

(63) Continuation of application No. PCT/JP2019/006737, filed on Feb. 22, 2019.

(30) Foreign Application Priority Data

Mar. 15, 2018 (JP) .............................. JP2018-048278

(51) Int. Cl.
*B23K 26/38* (2014.01)
*B23K 26/082* (2014.01)
*B23K 26/06* (2014.01)

(52) U.S. Cl.
CPC .......... *B23K 26/38* (2013.01); *B23K 26/0613* (2013.01); *B23K 26/0648* (2013.01);
(Continued)

(58) Field of Classification Search
CPC .. B23K 26/082; B23K 26/0665; B23K 26/38; B23K 26/073; B23K 26/0648
See application file for complete search history.

(56) References Cited

U.S. PATENT DOCUMENTS

| 5,245,682 A | * | 9/1993 | Ortiz, Jr. | ............... | G02B 6/4206 |
| | | | | | 385/38 |
| 2013/0148925 A1 | * | 6/2013 | Muendel | .............. | G02B 6/4216 |
| | | | | | 385/27 |

(Continued)

FOREIGN PATENT DOCUMENTS

| CN | 106415951 | 2/2017 |
| JP | 5-060935 | 3/1993 |

(Continued)

OTHER PUBLICATIONS

International Search Report of PCT application No. PCT/JP2019/006737 dated May 21, 2019.

(Continued)

*Primary Examiner* — Thien S Tran
(74) *Attorney, Agent, or Firm* — Wenderoth, Lind & Ponack, L.L.P.

(57) ABSTRACT

A laser oscillator includes a plurality of laser modules, beam coupler (12) that couples a plurality of laser beams (LB1 to LB4) emitted from the plurality of laser modules to form a coupled laser beam, beam coupler (12) emitting the coupled laser beam, and a condensing lens unit having a condensing lens, the condensing lens unit condensing the coupled laser beam to have a given beam diameter and guiding the condensed coupled laser beam to a transmission fiber. Beam coupler (12) has optical members (OC1 to OC4) configured to change optical paths of laser beams (LB1 to LB4). By changing the optical paths of laser beams (LB1 to LB4) by optical members (OC1 to OC4,) a beam profile of the (Continued)

coupled laser beam emitted from the transmission fiber is changed without adjusting a position of the condensing lens.

10 Claims, 10 Drawing Sheets

(52) U.S. Cl.
CPC ........ B23K 26/0665 (2013.01); B23K 26/082 (2015.10); B23K 26/0643 (2013.01)

(56) References Cited

U.S. PATENT DOCUMENTS

| | | | |
|---|---|---|---|
| 2015/0241632 A1* | 8/2015 | Chann | G02B 6/4296 385/27 |
| 2016/0116679 A1 | 4/2016 | Muendel et al. | |
| 2016/0322777 A1* | 11/2016 | Zediker | G02B 27/0922 |
| 2017/0021455 A1* | 1/2017 | Dallarosa | B23K 26/342 |
| 2019/0084082 A1 | 3/2019 | Ito et al. | |

FOREIGN PATENT DOCUMENTS

| | | |
|---|---|---|
| JP | 10-314973 | 12/1998 |
| JP | 2013-176800 | 9/2013 |
| JP | 2015-500571 | 1/2015 |
| JP | 2017-506769 | 3/2017 |
| WO | 2013/086227 | 6/2013 |
| WO | 2017/168857 | 10/2017 |

OTHER PUBLICATIONS

English Translation of Chinese Search Report dated Jul. 13, 2021 in corresponding Chinese Patent Application No. 201980008458.2.

* cited by examiner

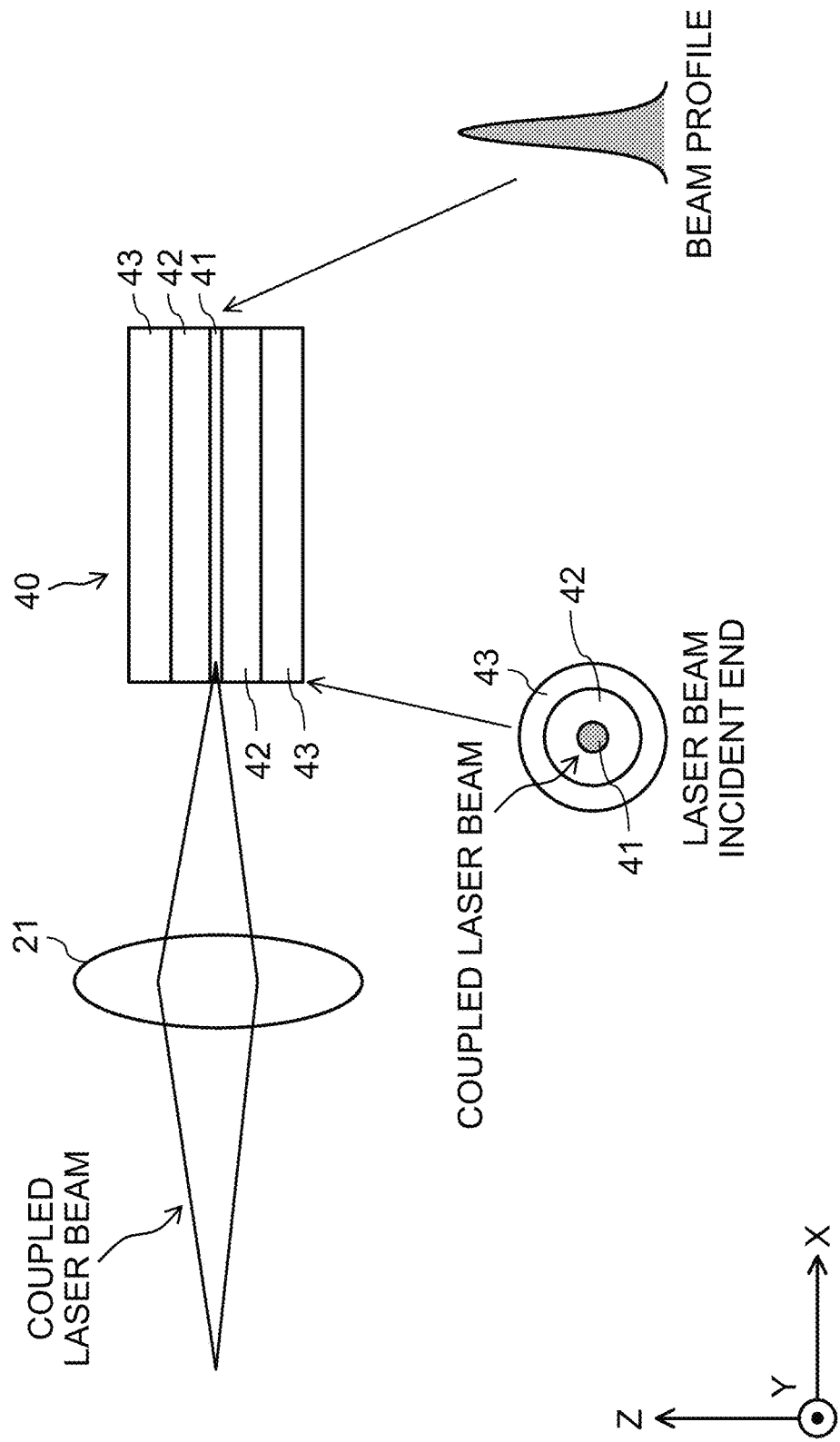

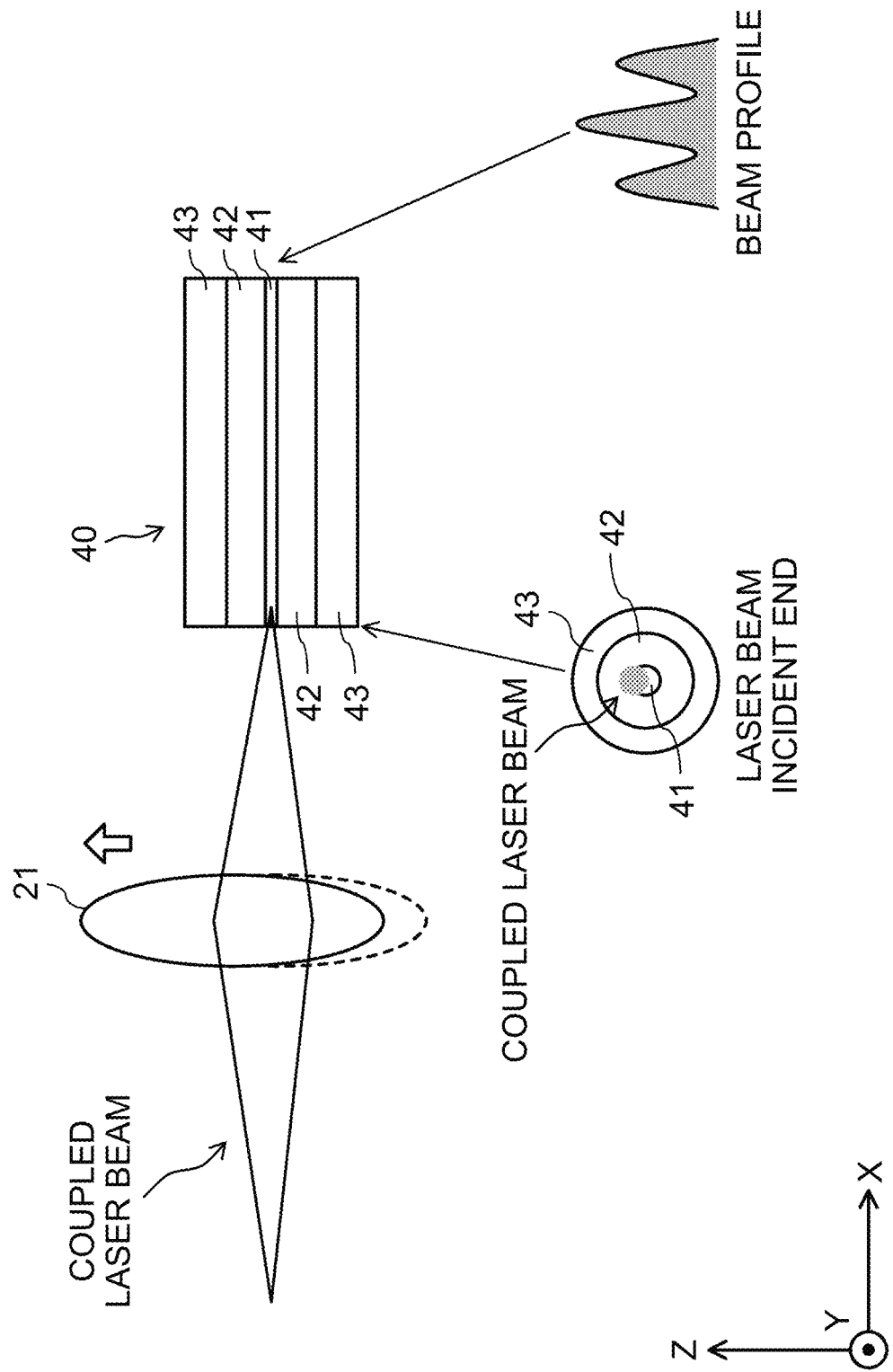

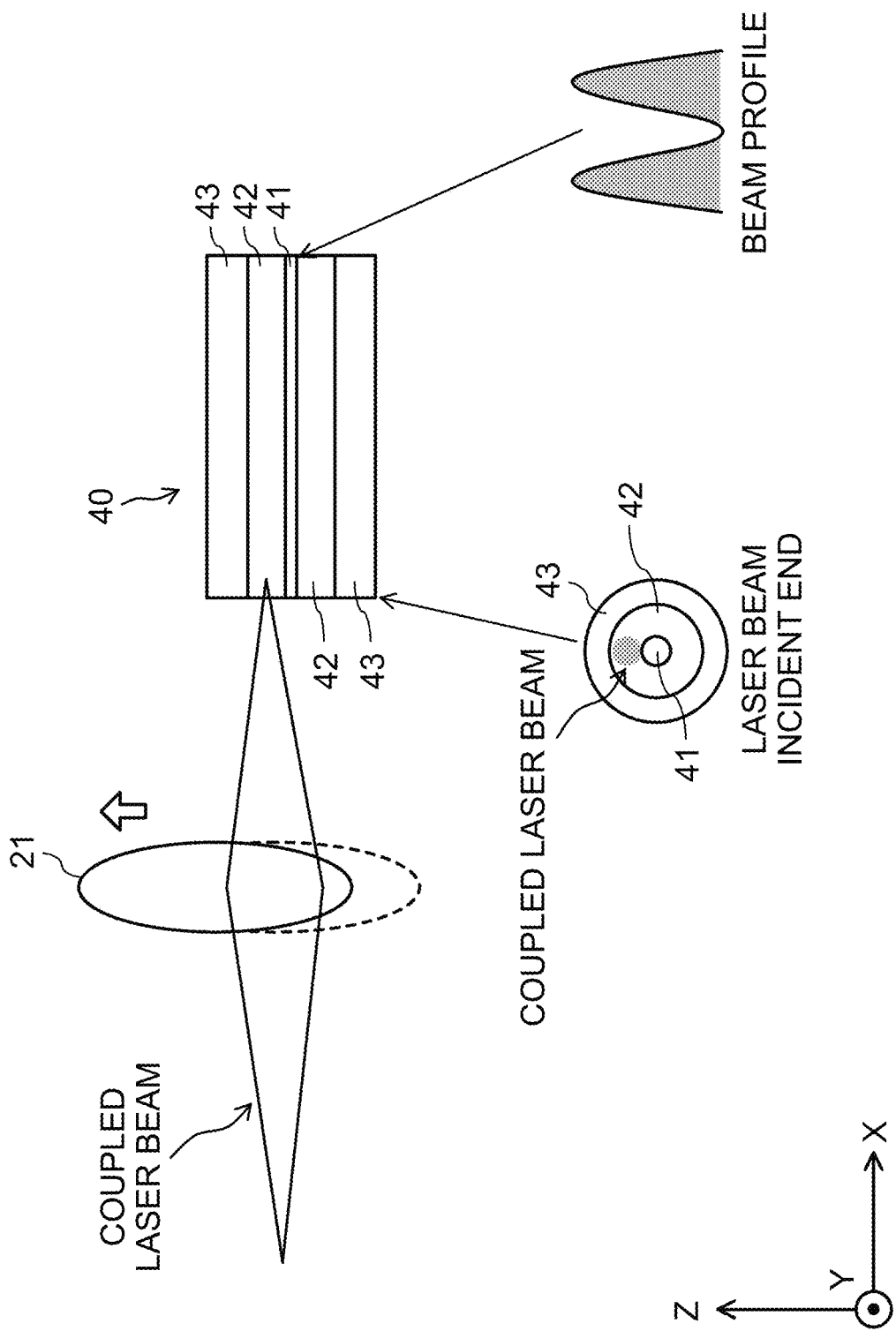

FIG. 5

| PATTERN | ARRANGEMENT OF OPTICAL MEMBERS | | STATE OF INCIDENCE OF LASER BEAMS AT INCIDENT END OF TRANSMISSION FIBER | BEAM PROFILE |
| --- | --- | --- | --- | --- |
| | NUMBER OF OPTICAL MEMBERS PLACED ON OPTICAL PATHS | NUMBER OF OPTICAL MEMBERS PLACED OUTSIDE OPTICAL PATHS | | |
| A | 0 | 4 | FOUR LASER BEAMS ARE ALL INCIDENT ON FIRST CORE | 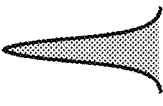 |
| B | 1 | 3 | THREE LASER BEAMS ARE INCIDENT ON FIRST CORE AS ONE LASER BEAM IS INCIDENT ON SECOND CORE | 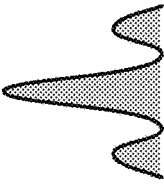 |
| C | 2 | 2 | TWO LASER BEAMS ARE INCIDENT ON FIRST CORE AS OTHER TWO LASER BEAMS ARE INCIDENT ON SECOND CORE | 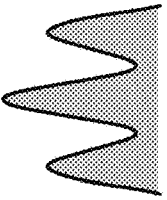 |
| D | 3 | 1 | ONE LASER BEAM IS INCIDENT ON FIRST CORE AS THREE LASER BEAMS ARE INCIDENT ON SECOND CORE | 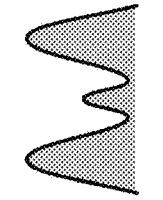 |
| E | 4 | 0 | FOUR LASER BEAMS ARE ALL INCIDENT ON SECOND CORE | 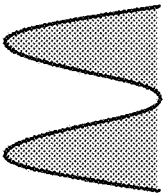 |

FIG. 8

| PATTERN | ARRANGEMENT OF OPTICAL MEMBERS | | STATE OF INCIDENCE OF LASER BEAMS AT INCIDENT END OF TRANSMISSION FIBER | BEAM PROFILE |
|---|---|---|---|---|
| | ON OPTICAL PATH | OUTSIDE OPTICAL PATH | | |
| A | NONE | OC1 OC5 OC6 | | |
| B | OC1 | OC5 OC6 | | |
| C | OC5 | OC1 OC6 | | |
| D | OC1 OC6 | OC5 | | |
| E | OC5 OC6 | OC1 | | |

LASER OSCILLATOR, LASER MACHINING DEVICE IN WHICH SAME IS USED, AND LASER OSCILLATION METHOD

TECHNICAL FIELD

The present disclosure relates to a laser oscillator, a laser machining device in which the laser oscillator is used, and a laser oscillation method.

BACKGROUND ART

In recent years, as a direct diode laser (which will hereinafter be referred to as "DDL") has become capable of higher power output, development of a laser machining device in which the DDL is used has been accelerated. The DDL can achieve high power output exceeding several kW, by coupling laser beams emitted from a plurality of laser modules. A coupled laser beam emitted from a beam coupler is guided to a machining head disposed in any given place, via a transmission fiber. In this process, the coupled laser beam emitted from the beam coupler is condensed through a condensing lens into the coupled laser beam with a spot dimeter small enough to make the laser beam fit in a core of the transmission fiber, and then enters the transmission fiber.

Now, works, which are objects to be machined by the laser machining device, vary in type, ranging from a thin pate to a thick plate. Performing fine machining requires considering important factors, which include not only beam power output and various construction conditions but also a beam profile. For example, when a thin plate is cut at high speed, it is required that a coupled laser beam with high power be condensed into a laser beam with a smaller spot diameter. It is appropriate in this case that the coupled laser beam emitted from the transmission fiber has a beam profile of a Gaussian shape. It is also preferable that a core diameter of the transmission fiber be reduced according to machining conditions. To cut a thick plate, on the other hand, a cut width larger than a cut width in the case of cutting a thin plate needs to be secured. It is necessary for this reason that the coupled laser beam be condensed into the coupled laser beam with a spot diameter of a certain size. In addition, to obtain a fine cut surface, a beam profile more appropriate than the Gaussian-shaped beam profile needs to be taken into consideration.

PLT1 discloses a configuration in which a condensing lens is disposed near an incident part of a transmission fiber and a spot diameter of a coupled laser beam incident on the transmission fiber is changed on the incident part side so that a beam profile of the coupled laser beam emitted from the transmission fiber can be adjusted.

CITATION LIST

Patent Literature

PTL 1: Japanese Translation of PCT International Application Publication No. 2015-500571

SUMMARY OF THE INVENTION

Technical Problem

However, according to the conventional configuration disclosed in PLT1, the beam profile is changed by adjusting the position of the condensing lens. Minor adjustment of the position of the condensing lens is, therefore, necessary, and a condensing lens position controller that allows such minor adjustment is also necessary. Such a configuration raises a concern that, to ensure precise control of the position of the condensing lens, the position controller becomes complicated and expensive.

The present disclosure has been conceived in view of the above circumstances, and it is therefore an object of the invention to provide a laser oscillator of a simpler configuration that can change a beam profile of a coupled laser beam emitted from a transmission fiber, a laser machining device in which the laser oscillator is used, and a laser oscillation method.

Solution to Problem

In order to achieve the above object, a laser oscillator according to the present disclosure is provided as a laser oscillator including; a plurality of laser modules that emit a plurality of laser beams, respectively; a beam coupler that couples the plurality of laser beams emitted from the plurality of laser modules to form a coupled laser beam, the beam coupler emitting the coupled laser beam; and a condensing unit having a condensing lens, the condensing unit condensing the coupled laser beam to have a given beam diameter and guiding the condensed coupled laser beam to a transmission fiber. The beam coupler has optical path changing means configured to change an optical path of at least one laser beam out of the plurality of laser beams received from the plurality of laser modules. By changing the optical path of the at least one laser beam by the optical path changing means, a beam profile of the coupled laser beam emitted from the transmission fiber is changed without adjusting a position of the condensing lens.

According to this configuration, the beam profile of the coupled laser beam emitted from the transmission fiber can be changed more easily.

A laser machining device according to the present disclosure at least includes: the above laser oscillator; a laser beam emission head attached to an emission end of a transmission fiber; and a controller that controls an operation of optical path changing means.

According to this configuration, a beam profile conforming to machining details, a shape of an object to be machined, or the like can be obtained, and thus laser machining with desired quality can be performed.

A laser oscillation method according to the present disclosure is provided as a laser oscillation method carried out by a laser oscillator that is connected to a transmission fiber and that includes a plurality of laser modules and a condensing lens, the laser oscillation method including: a beam coupling step of coupling a plurality of laser beams emitted from the plurality of laser modules to form a coupled laser beam and emitting the coupled laser beam; a condensing step of condensing the coupled laser beam through the condensing lens into the coupled laser beam with a given beam diameter and guiding the condensed coupled laser beam to the transmission fiber; and a beam profile changing step of changing, at the beam coupling step, an optical path of at least one laser beam out of the plurality of laser beams received from the plurality of laser modules, and changing a beam profile of the coupled laser beam emitted from the transmission fiber, without adjusting a position of the condensing lens.

According to this method, the beam profile of the coupled laser beam emitted from the transmission fiber can be changed more easily.

Advantageous Effect of Invention

According to the present disclosure, the beam profile of the coupled laser beam emitted from the transmission fiber can be changed more easily.

BRIEF DESCRIPTION OF DRAWINGS

FIG. 3A is a diagrammatical view showing a beam profile that results when an optical path is changed to cause a coupled laser beam to enter a first core.

FIG. 3B is a diagrammatical view showing a beam profile that results when an optical path is changed to cause the coupled laser beam to enter the first core and a second core.

FIG. 3C is a diagrammatical view showing a beam profile that results when an optical path is changed to cause the coupled laser beam to enter the second core.

FIG. 5 is a diagrammatical view showing beam profiles of a laser beam that result when an optical path is changed.

FIG. 8 is a diagrammatical view showing beam profiles of a laser beam that result when an optical path is changed.

DESCRIPTION OF EMBODIMENTS

Exemplary embodiments of the present disclosure will now be described in detail with reference to the drawings. The following description of preferred exemplary embodiments is merely illustrative in nature and is not intended at all to limit the present disclosure, applications thereof, or use thereof.

First Exemplary Embodiment

[Configuration of Laser Machining Device]

Figure 1:
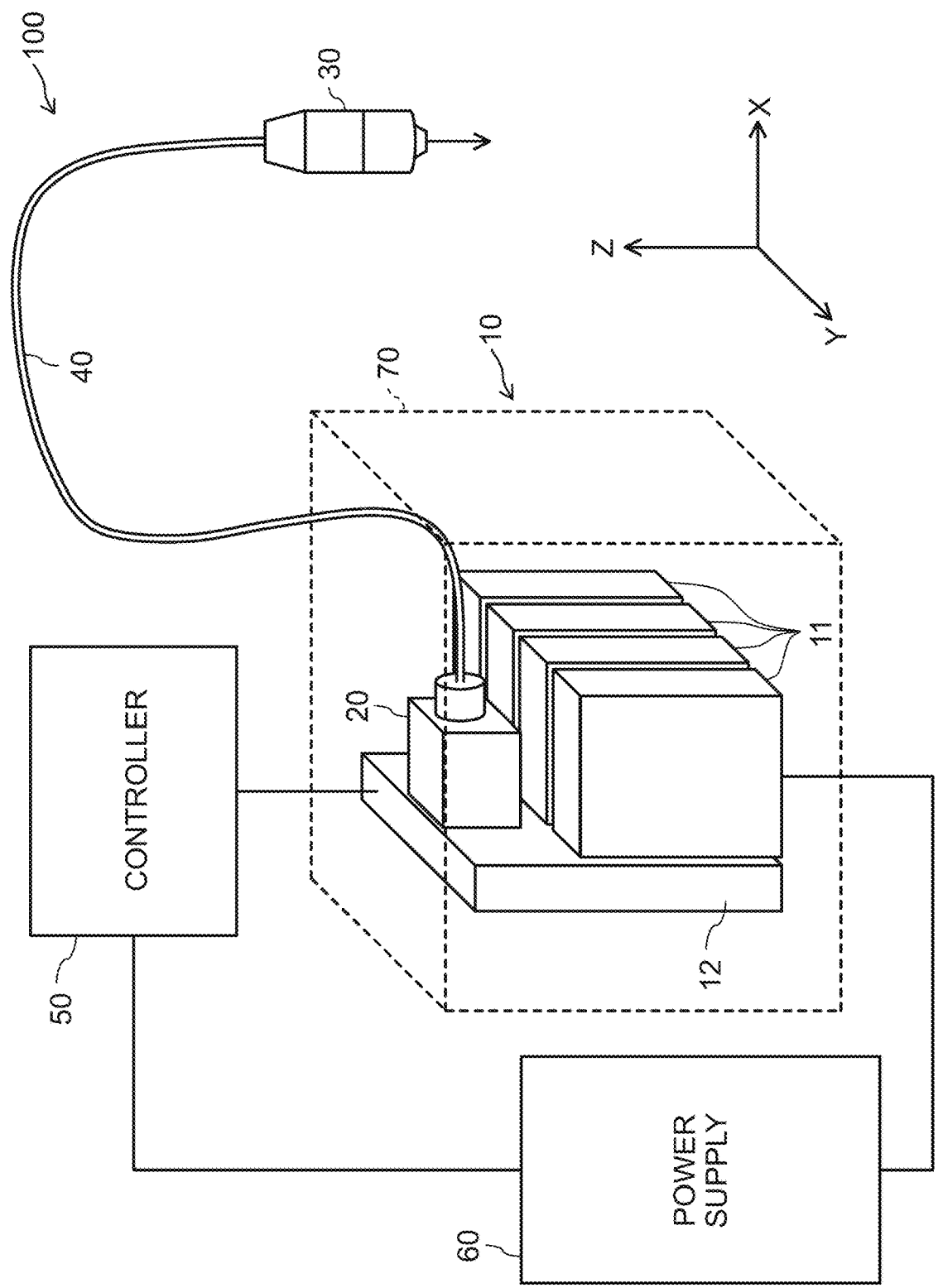
FIG. 1 is a diagrammatical view showing a configuration of a laser machining device according to a first exemplary embodiment of the present disclosure.
Figure 2:
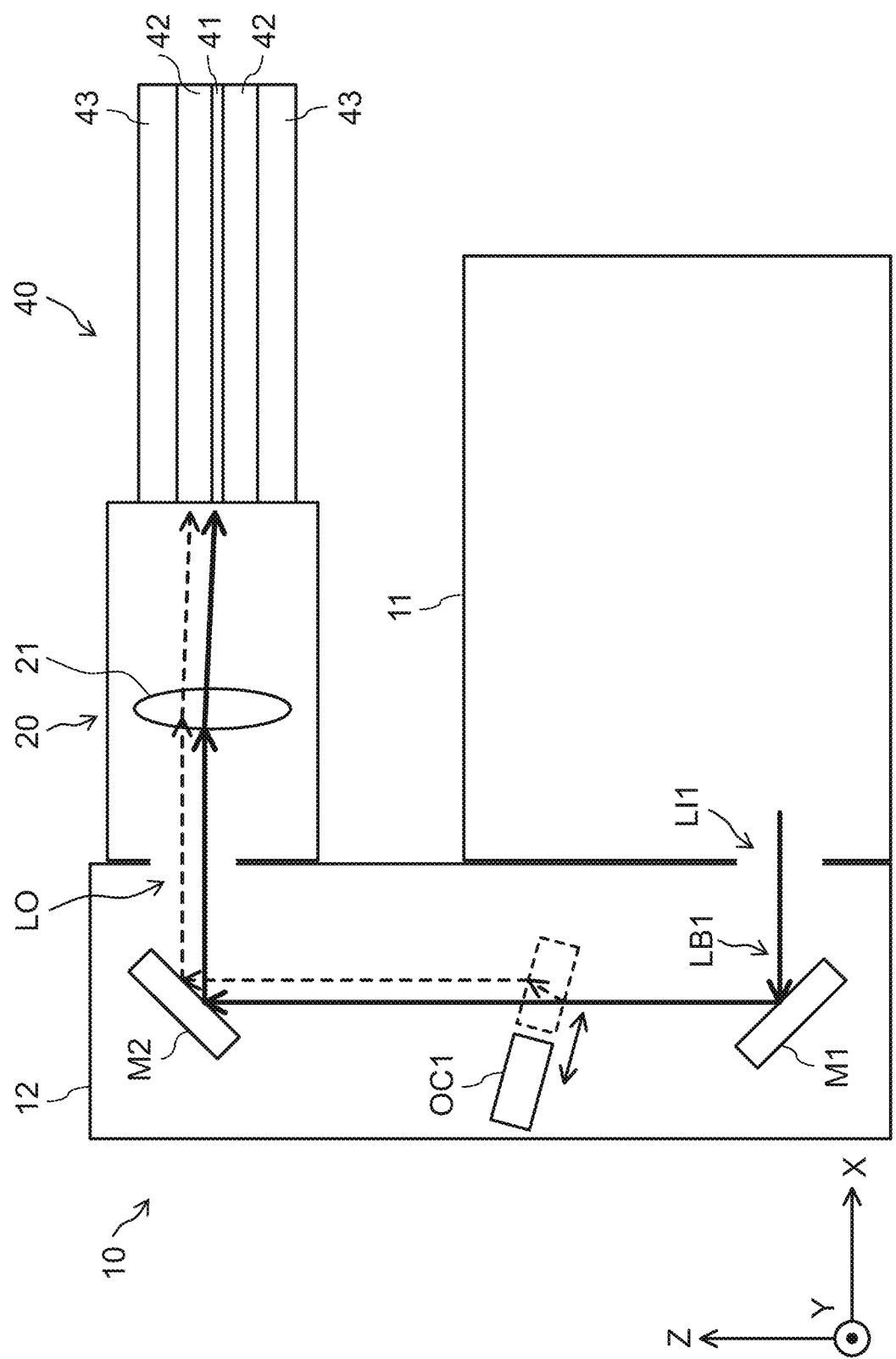
FIG. 2 is a partial diagrammatical view showing an internal configuration of a beam coupler.

FIG. 1 is a diagrammatical view showing a configuration of laser machining device 100 according to a first exemplary embodiment. FIG. 2 is a partial diagrammatical view showing an internal configuration of beam coupler 12. In FIG. 2, out of a plurality of laser beams LB1 to LB4, which will be described later, only laser beam LB1 is depicted along its course of traveling. In the following description, as indicated in FIG. 2, a direction in which laser beam LB1 travels when it is emitted from one of a plurality of laser modules 11 onto beam coupler 12 may be referred to as X direction, a direction in which laser beam LB1 reflected by mirror M1 travels toward mirror M2 may be referred to as Z direction, and a direction perpendicular to the X direction and to the Z direction may be referred to as Y direction.

Laser machining device 100 includes laser oscillator 10, laser beam emission head 30, transmission fiber 40, controller 50, and power supply 60. Laser oscillator 10 and an end of transmission fiber 40 on which laser beams LB1 to LB4 are incident (which end will hereinafter be simply referred to as "incident end") are housed in housing 70.

Laser oscillator 10 includes the plurality of laser modules 11, beam coupler 12, and condensing lens unit (condensing unit) 20. The plurality of laser modules 11 are composed of a plurality of laser diodes or an array of lasers that emit laser beams LB1 to LB4 having different wavelengths, respectively. Laser beams LB1 to LB4 having different wavelengths and emitted respectively from the plurality of laser modules 11 are coupled by beam coupler 12 into a single laser beam (which will hereinafter be referred to as "coupled laser beam"). The coupled laser beam is condensed by condensing lens 21 disposed in condensing lens unit 20 into the coupled laser beam with a beam diameter reduced at a given magnification, and then enters transmission fiber 40. By configuring laser oscillator 10 in this manner, high-power laser machining device 100 capable of laser beam power output exceeding several kW can be obtained. Laser oscillator 10 is supplied with power from power supply 60, which will be described later, and performs laser oscillation. Thus, the coupled laser beam having entered the transmission fiber 40 comes out of an end of transmission fiber 40 from which the coupled laser beam is emitted (which end will hereinafter be simply referred to as "emission end").

Beam coupler 12 has a plurality of mirrors M1 to M5 (see FIGS. 2 and 4) and a plurality of optical members (optical path changing means) OC1 to OC4 (see FIGS. 2 and 4), mirrors M1 to M5 and optical members OC1 to OC4 being arranged inside beam coupler 12. Mirrors M1 to M5 are each set tilted against an optical path of each of laser beams LB1 to LB4 so that laser beams LB1 to LB4 emitted respectively from the plurality of laser modules 11 are guided to laser beam emission unit LO (see FIGS. 2 and 4). Optical members OC1 to OC4 are parallelly arranged tabular members made of quartz glass, and transmit any one of the plurality of laser beams LB1 to LB4. Optical members OC1 to OC4 are arranged such that each of optical members OC1 to OC4 is allowed to move between a given position (first position) on the optical path of a given laser beam of laser beams LB1 to LB4 and a given position (second position) outside the optical path of the same. As shown in FIG. 2, in a case where optical member OC1 is at the first position (position of optical member OC1 indicated by a dotted line) and a case where optical member OC1 is at the second position (position of optical member OC1 indicated by a continuous line), an optical path of laser beam LB1 is determined to be an optical path indicated by a dotted line arrow and to be an optical path indicated by a continuous line arrow, respectively, as a result of optical path changing. This process will be described in detail later. A drawing and description of actuators that move optical members OC1 to OC4 are omitted.

Condensing lens unit 20 has condensing lens 21 in its interior. Condensing lens 21 condenses the coupled laser beam into the coupled laser beam that, at the incident end of transmission fiber 40, has a spot diameter smaller than the sum of a first core 41 and a second core 42, which will be described later. Condensing lens unit 20 also has a connector, which is not depicted, and the incident end of transmission fiber 40 is connected to this connector.

Transmission fiber 40 is optically coupled to condensing lens 21 of laser oscillator 10, and transmits the coupled laser beam, which is received from laser oscillator 10 via condensing lens 21, to laser beam emission head 30. Transmission fiber 40 has first core 41 on its axis, first core 41 having a substantially circular section. Transmission fiber 40 also has second core 42 that is in contact with a peripheral surface of first core 41 and that is coaxial with first core 41. Entering at least either first core 41 or second core 42, the coupled laser beam is transmitted to the emission end of transmission fiber 40.

Transmission fiber 40 is further provided with clad 43 that is in contact with a peripheral surface of second core 42 and that is coaxial with first core 41 and second core 42. Clad 43 is configured such that its refraction factor is lower than refraction factors of first core 41 and second core 42. First core 41 is configured such that its refraction factor is higher than the refraction factor of second core 42. According to this exemplary embodiment, first core 41 is made of quartz glass (with a refraction factor of about 1.45), and second core 42 is made of quartz glass (with a refraction factor of about 1.445) doped with fluorine. Clad 43 is made of quartz glass (with a refraction factor of about 1.43) doped more heavily with fluorine than second core 42. A configuration may be adopted in which both first core 41 and second core 42 are made of quartz glass and a low-refraction-factor layer made of quartz glass doped with fluorine, the low-refraction-factor layer having a refraction factor lower than those of first core 41 and second core 42, is interposed between first core 41 and second core 42.

It has been explained above that transmission fiber 40 has second core 42 that is in contact with the peripheral surface of first core 41 and that is coaxial with first core 41, and is further provided with clad 43 that is in contact with the peripheral surface of second core 42 and that is coaxial with first core 41 and second core 42. However, second core 42 may be replaced with a clad. In other words, transmission fiber 40 may be configured such that it has first clad that is in contact with the peripheral surface of first core 41 and that is coaxial with first core 41, and is further provided with a second clad (clad 43) that is in contact with the peripheral surface of the first clad (second core 42) and that is coaxial with first core 41 and the first clad.

In transmission fiber 40 having such a configuration, the coupled laser beam traveling from condensing lens unit 20 into transmission fiber 40 is totally reflected in first core 41 and second core 42 or in second core 42, and is emitted out of the emission end of transmission fiber 40. To put it another way, at least ether first core 41 or second core 42 functions as an optical waveguide for the coupled laser beam, and clad 43 functions as a light confining portion that confines the coupled laser beam in first core 41 and second core 42 each serving as the optical waveguide. A surface of clad 43 is covered with a film, which is not depicted.

Laser beam emission head 30 emits the coupled laser beam outside, the coupled laser beam being transmitted to laser beam emission head 30 through transmission fiber 40. For example, laser machining device 100 shown in FIG. 1 emits the coupled laser beam toward a work (not depicted) placed in a given location, the work being an object to be machined.

Controller 50 controls laser oscillation performed by laser oscillator 10. Specifically, controller 50 supplies control signals for controlling an output voltage, an on-time, and the like to power supply 60 connected to laser oscillator 10, thereby controlling laser oscillation of each laser modules 11. Each laser module 11 may be separately controlled to perform its laser oscillation. For example, different laser oscillation output, on-time, or the like may be set for each laser module 11. Controller 50 also controls operations of optical members OC1 to OC4 arranged in beam coupler 12, specifically, controls operations of actuators (not depicted) coupled to optical members OC1 to OC4. Controller 50 may also control an operation of a manipulator (not depicted) fitted with laser beam emission head 30.

As described above, power supply 60 supplies power for laser oscillation to laser oscillator 10, specifically, supplies such power to each laser module 11. Different amounts of power may be supplied respectively to laser modules 11 by instructions sent from controller 50. Power supply 60 may supply power to movable units of laser machining device 100. Otherwise, a different power supply (not depicted) may supply power to the movable units of laser machining device 100.

[Beam Profile of the Coupled Laser Beam]

When laser machining is carried out using laser machining device 100 shown in FIG. 1, a case of changing a beam profile of the coupled laser beam according to an object to be machined and machining details may arise. In such a case, by changing an incident position of the coupled laser beam at the incident end of transmission fiber 40, the beam profile of the coupled laser beam emitted from transmission fiber 40 can be changed. In the following, for simpler description, in what way the beam profile changes in a case where a conventional method is used, the conventional method being a method of changing an optical path of the coupled laser beam by adjusting the position of condensing lens 21, will be explained first with reference to FIGS. 3A to 3C.

FIGS. 3A to 3C are diagrammatical views each showing a relationship between an optical path (incident position) of the coupled laser beam and a beam profile of the coupled laser beam emitted from transmission fiber 40. It should be noted that the case to be described is a case where an optical fiber of a structure shown in FIGS. 1 and 2, i.e., double-core structure having first core 41 and second core 42 is used as transmission fiber 40.

As shown in lower left in FIG. 3A, the position of condensing lens 21 is adjusted first so that a spot diameter of the coupled laser beam fits in a core diameter of first core 41 and then the coupled laser beam is caused to enter transmission fiber 40. As a result, the coupled laser beam emitted from the transmission fiber 40 has a beam profile of a single-peaked Gaussian distribution (see lower right in FIG. 3A). In this description, "beam profile" means a spacial distribution of laser beam intensity. In FIGS. 3A to 3C, laser beam intensity is indicated by waveform changes in the Z direction while laser beam spacial distribution is indicated by waveform changes in the X direction. In this exemplary embodiment, waveform changes in the Y direction, which are not depicted, are the same as waveform changes in the X direction. However, laser beam spacial distribution in the X direction may be different from laser beam spacial distribution in the Y direction.

Now, as shown in FIG. 3B, when condensing lens 21 is moved by a given distance in a direction intersecting the optical path of the coupled laser beam, that is, in the Z direction, the coupled laser beam becomes incident not only on first core 41 but also on second core 42 (see lower left in FIG. 3B). In this case, the coupled laser beam emitted from the transmission fiber 40 has a beam profile of a three-peaked shape, and a half width of this beam profile is larger than that of the beam profile shown in FIG. 3A (see lower right in FIG. 3B).

When condensing lens 21 in the positioned state of FIG. 3B is further moved in the Z direction, the coupled laser beam becomes incident only on second core 42 (see lower left in FIG. 3C). As a result, the coupled laser beam emitted from the transmission fiber 40 has a beam profile of a two-peaked shape In this case, a half width of the beam profile is larger than that of the beam profile shown in FIG. 3A (see lower right in FIG. 3C) but is smaller than that of the beam profile shown in FIG. 3B.

In this manner, by adjusting the position of the condensing lens 21 for guiding the coupled laser beam to transmission fiber 40, the laser beam incident position at the incident end of transmission fiber 40 is changed. This allows adjustment of a ratio between the coupled laser beam that propagates through first core 41 and the coupled laser beam that propagates through second core 42. In addition, as shown in FIGS. 3A to 3C, by changing the position of condensing lens 21 consecutively, the beam profile of the coupled laser beam is adjusted in a step-less manner. A desired beam profile, therefore, can be obtained.

[Operation of Changing the Beam Profile of the Coupled Laser Beam]

However, the core diameter of first core 41 of transmission fiber 40 is usually ranges from several tens μm to several hundreds μm, which is small. To change the beam profile of the coupled laser beam in the manners shown in FIGS. 3A to 3C, therefore, the position of condensing lens 21, which causes the coupled laser beam to enter transmission fiber 40, needs to be adjusted precisely. Thus, complicated position control is required. An expensive position controller for position control is also required.

To deal with such a problem, the present disclosure proposes a configuration in which an optical path of at least one laser beam out of the plurality of laser beams LB1 to LB4, which are emitted from the plurality of laser modules 11, is changed by an optical member to change the beam profile of the coupled laser beam emitted from transmission fiber 40.

Figure 4:
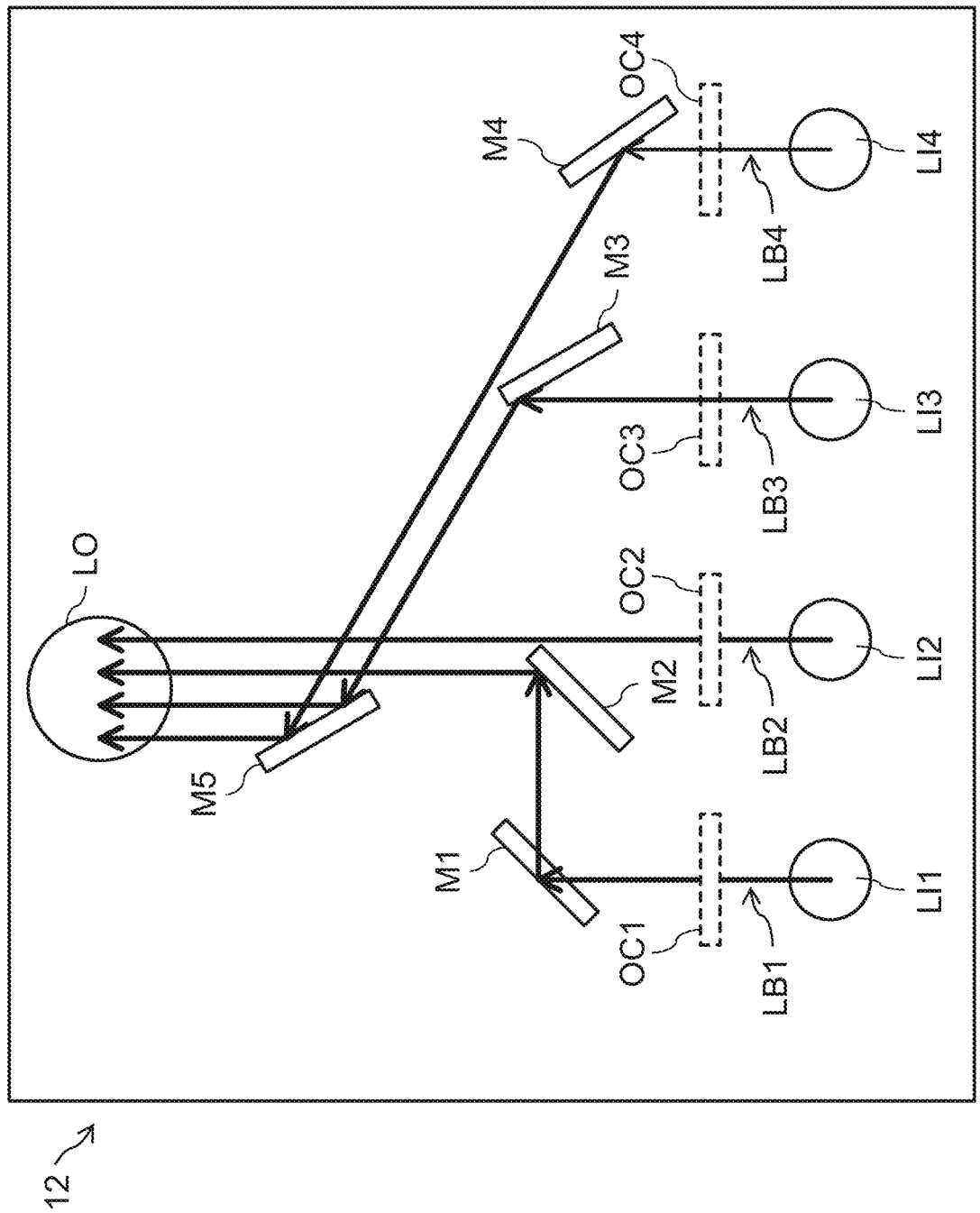
FIG. 4 is a diagrammatical view showing an internal configuration of the beam coupler at the time of laser oscillation.

FIG. 4 is a diagrammatical view showing an internal configuration of beam coupler 12 according to this exemplary embodiment at the time of laser oscillation. FIG. 5 is a diagrammatical view showing beam profiles of the coupled laser beam that result when an optical path is changed. A case described in this exemplary embodiment is a case where laser beams LB1 to LB4 emitted respectively from four laser modules 11 are coupled into the single coupled laser beam in beam coupler 12 and the coupled laser beam is emitted toward condensing lens unit 20. However, a number of laser modules 11 and a number of laser beams emitted therefrom are not limited to numbers indicated in the above case. The beam profiles shown in FIG. 5 demonstrate waveform changes on a plane defined by the X direction and the Z direction, as the beam profiles shown in FIGS. 3A to 3C do.

As shown in FIG. 4, beam coupler 12 has laser beam incident units LI1 to LI4 corresponding to four laser beams LB1 to LB4, and laser beam emission unit LO from which the coupled laser beam comes out. In beam coupler 12, five mirrors M1 to M5 are arranged such that each of mirrors M1 to M5 makes a given angle against an optical path of each of laser beams LB1 to LB4 near each of laser beam incident units LI1 to LI4. Between laser beam incident units LI1 to LI4 and mirrors M1 to M4, optical members OC1 to OC4 are arranged, respectively. Optical members OC1 to OC4 are arranged such that a surface of each of optical members OC1 to OC4 makes a given angle large than 0 degrees and smaller than 90 degrees against the optical path of each of laser beams LB1 to LB4 corresponding respectively to optical members OC1 to OC4, near each of laser beam incident units LI1 to LI4. As described above, optical members OC1 to OC4 are arranged such that each of optical members OC1 to OC4 is allowed to move between the first position on the optical path of each of laser beams LB1 to LB4, which correspond respectively to optical members OC1 to OC4, and the second position outside the optical path of the same.

A case where optical members OC1 to OC4 are all outside respective optical paths of laser beams LB1 to LB4 corresponding respectively to optical members OC1 to OC4, that is, all on the second positions will first to be examined. When four laser beams LB1 to LB4 are incident on beam coupler 12, laser beam LB1 having entered beam coupler 12 through laser beam incident unit LI1 is reflected by mirror M1 and proceeds to mirror M2. Laser beam LB1 is then reflected again by mirror M2 to proceed to laser beam emission unit LO. In the same manner, laser beam LB3 is reflected by mirror M3 and then by mirror M5 to proceed to laser beam emission unit LO, and laser beam LB4 is reflected by mirror M4 and then by mirror M5 to proceed to laser beam emission unit LO. Meanwhile, laser beam LB2 having entered beam coupler 12 through laser beam incident unit LI2 travels straight, thus proceeding directly to laser beam emission unit LO. As a result, in the vicinity of laser beam emission unit LO, laser beams LB1 to LB4 have their optical axes put close to each other, thus forming the single coupled laser beam, which comes out of laser beam emission unit LO. Hence, as shown in a pattern A column in FIG. 5, the coupled laser beam has the beam profile of the single-peaked Gaussian distribution. It should be noted that the optical axes of laser beams LB1 to LB4 do not match completely. The coupled laser beam, therefore, has a beam profile that is spacially expanded to be wider than a beam profile of each of laser beams LB1 to LB4.

Another case will then be examined, in which when optical members OC1 to OC4 are all outside respective optical paths of laser beams LB1 to LB4 corresponding respectively to optical members OC1 to OC4, that is, all on the second positions, only optical member OC1 is moved to a position on the optical path of laser beam LB1, i.e., first position. In this case, the refraction factor of optical member OC1 (which is about 1.45 as the refraction factor of quarts glass) is higher than the refraction factor of a space that laser beam LB1 passes through (which is about 1 as the refraction factor of air). For this reason, when laser beam LB1 is incident on optical member OC1, laser beam LB1 is refracted and its optical path is changed in optical member OC1. Similarly, when laser beam LB1 comes out of optical member OC1, laser beam LB1 is refracted and its optical path is changed. This means that the optical path of laser beam LB1 in the case of optical member OC1 being on the optical path of laser beam LB1 becomes different from the optical path of laser beam LB1 in the case of optical member OC1 being outside the optical path of laser beam LB1. Thus, in the coupled laser beam in the former case, laser beam LB1 comes to have an optical axis shifted from the optical axes of other three laser beams LB2 to LB4. The refraction factor and thickness of optical member OC1 are determined so that when optical member OC1 is placed on the optical path of laser beam LB1, laser beam LB1 is incident on second core 42. As a result, as described in a pattern B column in FIG. 5, laser beam LB1 is incident on second core 42 as laser beams LB2 to LB4 are incident on first core 41. Hence, as indicated in the pattern B column in FIG. 5, the coupled laser beam has a beam profile of a three-peaked shape in which two peaks are formed on both sides of the single-peaked Gaussian distribution. In this beam profile, each of the peaks is lower than the peak of the beam profile indicated in the pattern A column. The beam profile shown in the pattern B column of FIG. 5 is a waveform wider in the X direction than a waveform formed as the beam profile shown in the pattern A column.

By placing one of optical members OC1 to OC4 on an optical path of a laser beam corresponding to the one of optical members OC1 to OC4, the beam profile shown in the pattern B column of FIG. 5 can be obtained. The refraction factor and thickness of each of optical members OC2 to OC4 are also determined so that when each of optical members OC2 to OC4 is placed on an optical path of a laser beam corresponding to each of optical members OC2 to OC4, the corresponding laser beam is incident on second core 42.

Still another case will then be examined, in which when optical members OC1 to OC4 are all outside respective optical paths of laser beams LB1 to LB4 corresponding respectively to optical members OC1 to OC4, that is, all on the second positions, two of optical members OC1 to OC4 are placed on optical paths of laser beams corresponding respectively to the two of optical members OC1 to OC4, e.g., optical members OC1, OC2 are placed on optical paths of laser beams LB1, LB2, respectively.

In this case, the optical paths of laser beams LB1, LB2 are changed respectively by optical members OC1, OC2. As a result, laser beams LB1, LB2 become incident on second core 42. As a result, as shown in a pattern C column in FIG. 5, the coupled laser beam has a beam profile of a three-peaked shape. Out of three peaks of this beam profile, the peak at its center is lower than the peak at the center of the beam profile shown in the pattern B column. However, the peaks on both sides of the above peak are higher than the peaks on both side of the peak at the center of the beam profile shown in the pattern B column. This is because that an amount of the coupled laser beam incident on second core 42 has increased to become greater than an amount of the same in the case shown in the pattern B column.

Still another case will then be examined, in which when optical members OC1 to OC4 are all outside respective optical paths of laser beams LB1 to LB4 corresponding respectively to optical members OC1 to OC4, that is, all on the second positions, three of optical members OC1 to OC4 are placed on optical paths of laser beams corresponding respectively to the three of optical members OC1 to OC4, e.g, optical members OC1 to OC3 are placed on optical paths of laser beams LB1 to LB3, respectively. In this case, the optical paths of laser beams LB1 to LB3 are changed respectively by optical members OC1 to OC3. As a result, laser beams LB1 to LB3 become incident on second core 42. As a result, as shown in a pattern D column in FIG. 5, the coupled laser beam has a beam profile of a three-peaked shape. Out of three peaks of this beam profile, the peak at its center is lower than the peak at the center of the beam profile shown in the pattern C column. However, the peaks on both sides of the above peak are higher than the peaks on both side of the peak at the center of the beam profile shown in the pattern C column. This is because that an amount of the coupled laser beam incident on second core 42 has increased to become greater than an amount of the same in the case shown in the pattern C column. In the case shown in the pattern C column, the beam profile of the coupled laser beam has the peaks on both sides that are higher than the peak at the center.

As indicated in FIG. 4, in a case where optical members OC1 to OC4 are all outside respective optical paths of laser beams LB1 to LB4 corresponding respectively to optical members OC1 to OC4, that is, all on the second positions and then are moved to positions on the optical paths of the laser beams corresponding respectively to all optical members OC1 to OC4, i.e., the first positions, the optical paths of laser beams LB1 to LB4 are changed respectively by optical members OC1 to OC4. As a result, laser beams LB1 to LB4 become all incident on second core 42. As a result, as shown in a pattern E column in FIG. 5, the coupled laser beam has a beam profile of a double-peaked shape. This beam profile results because that no laser beam is incident on first core 41. Two peaks of this beam profile are higher than the peaks on both sides of the beam profiles shown in the pattern D column.

[Effects and the Like]

As described above, laser oscillator 10 according to this exemplary embodiment includes four laser modules 11 that emit laser beams LB1 to LB4, respectively, beam coupler 12 that couples four laser beams LB1 to LB4 emitted from the four laser modules 11 to form the coupled laser beam, beam coupler 12 emitting the coupled laser beam, and condensing lens unit 20 having condensing lens 21, the condensing lens unit 20 condensing the coupled laser beam to have a given beam diameter and guiding the condensed coupled laser beam to transmission fiber 40. Beam coupler 12 has optical members OC1 to OC4 configured to change an optical path of at least one laser beam out of four laser beams LB1 to LB4 received from four laser modules 11. By changing at least one of the optical paths of laser beams LB1 to LB4 by optical members OC1 to OC4, the beam profile of the coupled laser beam emitted from transmission fiber 40 is changed without adjusting the position of condensing lens 21.

By configuring laser oscillator 10 in the above manner, the beam profile of the coupled laser beam emitted from transmission fiber 40 can be changed easily to obtain a beam profile conforming to laser machining details, the shape of an object to be machined, or the like. Hence laser machining of desired quality can be performed.

For example, when a thin steel plate is cut and machined by laser machining device 100, laser machining should preferably be performed such that an energy density at a cutting spot is increased and that a cut width is reduced. It is thus preferable that, as shown in the pattern A column in FIG. 5, the beam profile be adjusted to the Gaussian distribution of the single-peaked shape. When a thick steel plate is cut and machined by laser machining device 100, in contrast, a relatively large cut width needs to be adopted to cut the steel plate with a large thickness. It is therefore preferable that, as shown in the pattern B column to pattern E column in FIG. 5, the beam profile be adjusted to a spacially expanded shape by changing at least one of the optical paths of laser beams LB1 to LB4 by one of optical members OC1 to OC4 to cause at least one of beams LB1 to LB4 to enter second core 42. In laser cutting/machining, a case arises where spatters scattered by a work, which is an object to be machined, deposit on the work itself to deteriorate machining quality. Production of such spatters can be suppressed by selecting any one of the beam profiles shown in the pattern B column to pattern E column. In general, a lower peak of the beam profile, which indicates laser beam intensity, leads to easiness in suppressing spatter production.

Transmission fiber 40 at least has first core 41 that functions as an optical waveguide, second core 42 that is in contact with the peripheral surface of first core 41 and that is coaxial with first core 41, second core 42 functioning as an optical waveguide, and clad 43 that is in contact with the peripheral surface of second core 42 and that is coaxial with first core 41 and second core 42. When the optical paths of laser beams LB1 to LB4 are not changed by optical members OC1 to OC4, condensing lens unit 20 guides laser beams LB1 to LB4 to first core 41 of transmission fiber 40. When any one of the optical paths of laser beams LB1 to LB4 is changed by any one of optical members OC1 to OC4, however, condensing lens unit 20 guides a laser beam whose optical path has been changed, to second core 42. Thus, by using optical members OC1 to OC4, the coupled laser beam can be guided to first core 41 only, or to first core 41 and second core 42, or to second core 42 only. The beam profile of the coupled laser beam emitted from transmission fiber 40, therefore, can be changed easily.

Optical members OC1 to OC4 are configured such that they shift respective optical paths of laser beams LB1 to LB4 in parallel by a given distance. By configuring optical members OC1 to OC4 in such a manner, an optical path of a laser beam is defined exactly after an optical path change. As a result, a ratio between laser beams incident on first core 41 of transmission fiber 40 and laser beams incident on second core 42 of the same can be adjusted exactly in a highly reproductive manner. Optical members OC1 to OC4 are provided as parallelly arranged tabular members that transmit laser beams LB1 to LB4. This allows respective optical paths of laser beams LB1 to LB4 to be shifted in parallel by the given distance.

Optical members OC1 to OC4 are arranged such that each of optical members OC1 to OC4 makes a given angle against each of the optical paths of laser beams LB1 to LB4 and that each of optical members OC1 to OC4 is allowed to move between the first position on the optical path of each of laser beams LB1 to LB4 and the second position outside the optical path of the same. By configuring optical members OC1 to OC4 in such a manner, a sufficient margin can be secured in adjustment of optical coupling between transmission fiber 40 and the coupled laser beam after an optical path change. In addition, changing the optical paths of laser beams LB1 to LB4 through minor adjustment of the position of condensing lens 21 or angles of mirrors M1 to M5 in beam coupler 12 becomes unnecessary. In a simple configuration, therefore, the beam profile of the coupled laser beam emitted from transmission fiber 40 can be changed.

As described above, near laser beam emission unit LO of beam coupler 12, respective optical paths of the plurality of laser beams LB1 to LB4 do not match completely. For this reason, the coupled laser beam has a beam profile of a spacially expended shape. In other words, the beam diameter of the coupled laser beam is larger than the beam diameter of each of laser beams LB1 to LB4. For example, as indicated in this exemplary embodiment, when a coupled laser beam is generated using four laser modules 11 each capable of power output of 1 kW, the beam diameter of the coupled laser beam is about 80 µm. It follows then that, to allow this coupled laser beam to enter first core 41 of transmission fiber 40 with a given margin, the core diameter of first core 41 needs to be about 100 µm at minimum. Meanwhile, the core diameter of second core 42 can usually be determined to be larger than the core diameter of first core 41. This is because that while the core diameter of first core 41 is required to be smaller for the purpose of increasing light density in first core 41 as much as possible, the core diameter of second core 42 is determined to be larger than that of first core 41 in many cases for the reason that second core 42 makes light more dispersive, i.e., less dense. For example, when the core diameter of second core 42 is 360 µm, a width of second core 42 in a direction of a radius of transmission fiber 40 is 130 µm. A margin in adjustment of optical coupling between transmission fiber 40 and coupled laser beam is, therefore, greater in a case of causing the coupled laser beam to enter second core 42 than in a case of causing the entire coupled laser beam to enter first core 41. It is preferable that the core diameter of second core 42 be three times or more the core diameter of first core 41.

It is desirable that an arrangement of optical systems of laser oscillator 10 be adjusted in the initial stage, the arrangement including an angle of an optical member against a laser beam corresponding thereto. Specifically, for example, if an initial arrangement is made such that optical members OC1 to OC4 are all outside optical paths so that the entire coupled laser beam is incident on first core 41, the optical paths of laser beams LB1 to LB4 can be changed by a simple operation of placing or removing optical members OC1 to OC4 on or from the optical paths of laser beams LB1 to LB4. It is not required that arrangement of optical members OC1 to OC4 before and after movement of optical members OC1 to OC4 be highly precise. For example, a case is assumed where when optical members OC1 to OC4 are moved to respective first positions on the optical paths of laser beams LB1 to LB4, actual positions of optical members OC1 to OC4 moved are shifted from the intended first positions by 10% or more. In this case, because optical members OC1 to OC4 each make a given angle larger than 0 degrees and smaller than 90 degrees against each of the optical paths of laser beams LB1 to LB4, the above shift from the intended first positions does not have an effect on optical paths of laser beams LB1 to LB4 that are formed as a result of optical path changes by optical members OC1 to OC4. The beam profile of the coupled laser beam, therefore, can be changed easily in a highly reproductive manner.

Laser machining device 100 according to this exemplary embodiment includes at least laser oscillator 10 described above, laser beam emission head 30 attached to the emission end of transmission fiber 40, and controller 50 that controls operations of optical members OC1 to OC4.

By configuring laser machining device 100 in this manner, the beam profile of the coupled laser beam emitted from laser beam emission head 30 can be changed easily in a highly reproductive manner to obtain a beam profile conforming to laser machining details, the shape of an object to be machined, or the like. Hence laser machining of desired quality can be performed.

<Modifications>

Figure 6:
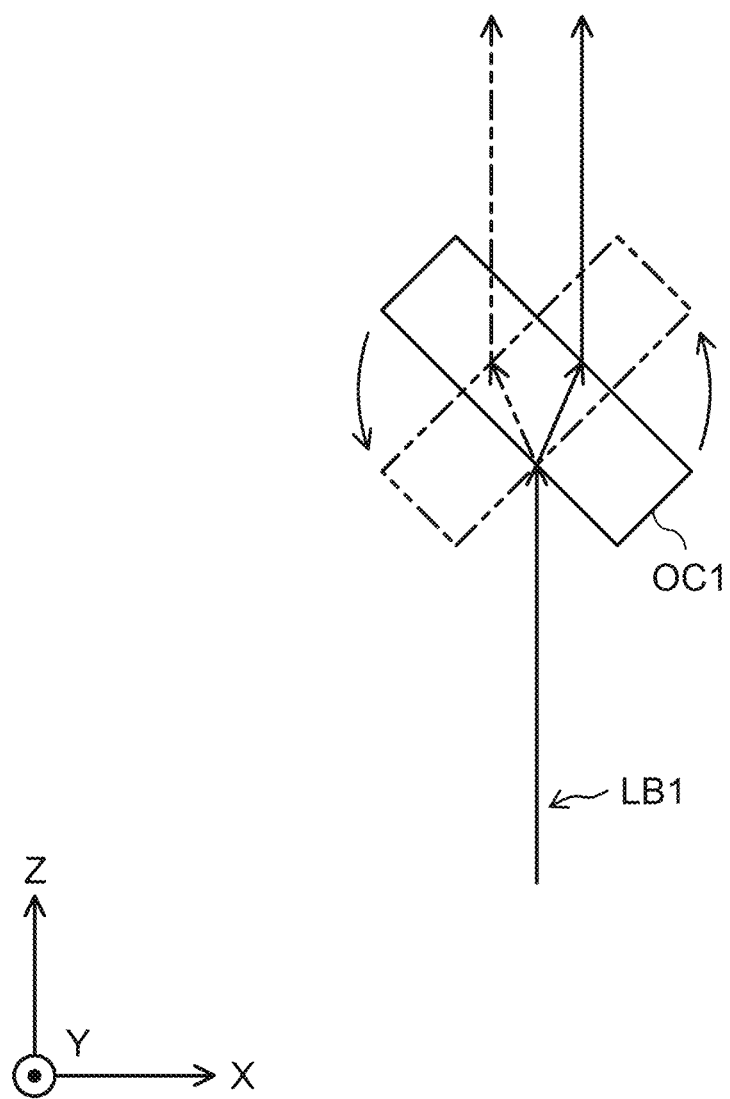
FIG. 6 is a diagrammatical view showing an optical path changing operation by an optical member according to a modification.

FIG. 6 is a diagrammatical view showing an optical path changing operation by an optical member according to a modification.

This modification is different from the configuration shown in the first exemplary embodiment in a form of a positional shift of optical member OC1 after an optical path change. According to the first exemplary embodiment, optical member OC1 is placed on the first position on the optical path of laser beam LB1 to change the optical path of laser beam LB1 utilizing a difference in refraction factor between the air and optical member OC1. According to this modification, on the other hand, optical member OC1 is disposed in advance on the first position on the optical path of laser beam LB1, and, in this arrangement, laser beam LB1 is incident on first core 41. When an optical path change is carried out, optical member OC1 is rotated around an optical axis of laser beam LB1 by a given angle, which is 90 degrees in this case, to change the optical path of laser beam LB1. As a result, laser beam LB1 becomes incident on second core 42.

As shown in FIG. 6, a change in an angle that optical member OC1 makes against the optical path of laser beam LB1 results in a change in a direction in which laser beam LB1 is refracted inside optical member OC1. Consequently, the optical path of laser beam LB1 coming out of optical member OC1 is changed.

According to this modification, in the same manner as in the first exemplary embodiment, the beam profile of the coupled laser beam emitted from transmission fiber 40 can be changed easily in a highly reproductive manner to obtain a beam profile conforming to laser machining details, the shape of an object to be machined, or the like. Hence laser machining of desired quality can be performed. The modification allows a reduction in a space in which optical member OC1 is moved, thus allowing miniaturization of beam coupler 12, which makes laser oscillator 10 space-saving equipment. According to this modification, the angle of rotation of optical member OC1 is determined to be 90 degrees. The angle of rotation, however, may be determined to be an angle different from 90 degrees.

Second Exemplary Embodiment

Figure 7:
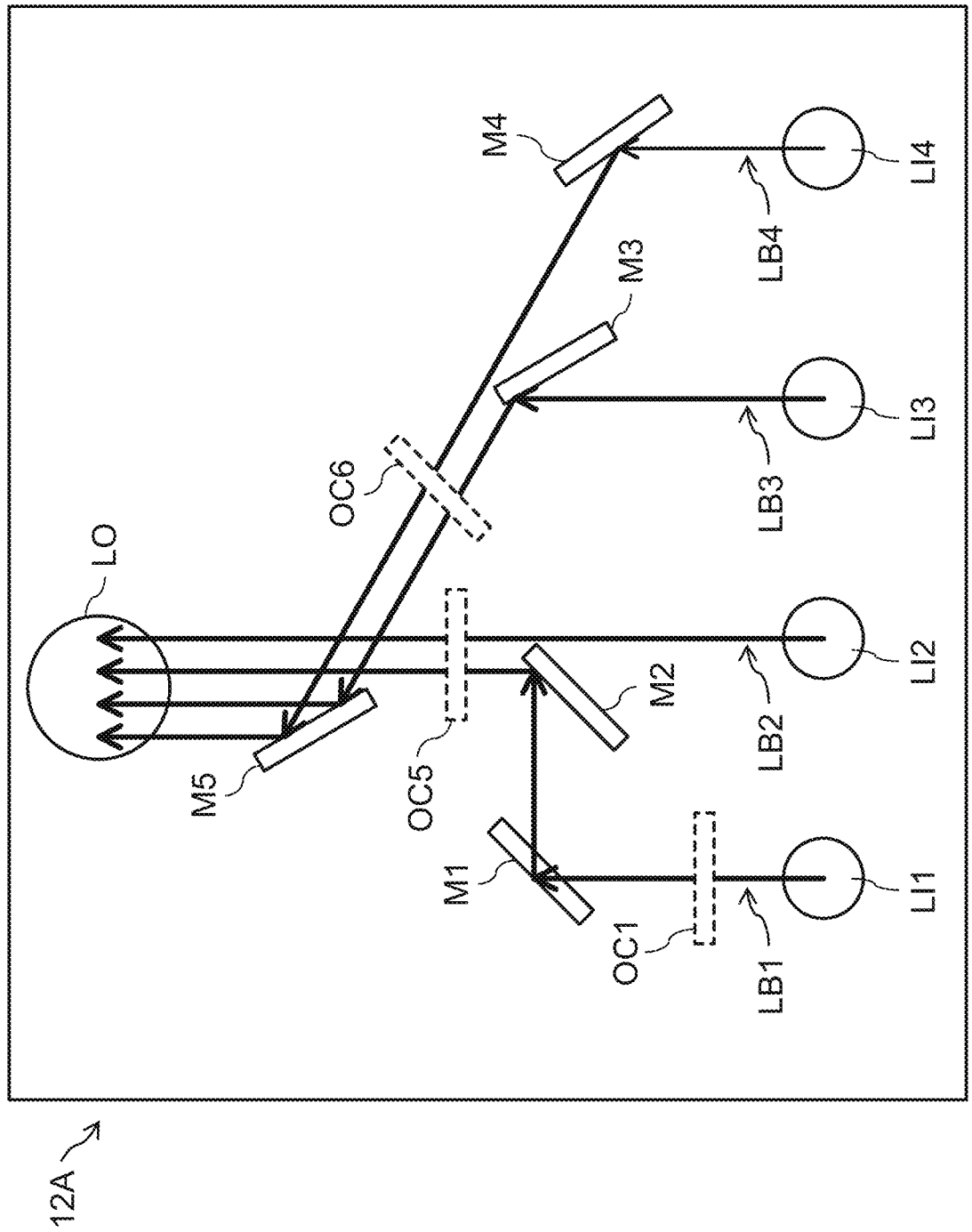
FIG. 7 is a diagrammatical view showing an internal configuration of a beam coupler according to a second exemplary embodiment of the present disclosure.

FIG. 7 is a diagrammatical view showing an internal configuration of beam coupler 12A according to a second exemplary embodiment, and FIG. 8 is a diagrammatical view showing beam profiles of a laser beam that result when an optical path is changed. In the second exemplary embodiment, the same components as described in the first exemplary embodiment are denoted by the same reference marks, and detailed description of such components is omitted.

This modification is different from the configuration shown in the first exemplary embodiment in the number of optical members arranged and in the positions of the optical members. As indicated in the first exemplary embodiment, when optical members OC1 to OC4 are arranged respectively to laser beams LB1 to LB4 that are not coupled yet, the coupled laser beam actually formed varies to have five 5 patterns of beam profiles. Patterns of arrangement of optical members OC1 to OC4 to the optical paths of laser beams LB1 to LB4 are, on the other hand, amount to 16 patterns. This makes controlling movement of optical members OC1 to OC4 a redundant process. In addition, when controller 50 controls operations of optical members OC1 to OC4, controller 50 has to perform unnecessarily complicated control.

To deal with this problem, according to this exemplary embodiment, attention is paid to a fact that optical axes of some laser beams are in a state of being close and parallel to each other before the plurality of laser beams LB1 to LB4 are finally coupled together. Specifically, by disposing one optical member on optical paths of a plurality of laser beams in such a state, the number of optical members to be arranged is reduced. As a result, control of operations of optical members can be simplified.

For example, as shown in FIG. 7, laser beam LB1 reflected by mirror M2 has an optical axis close to laser beam LB2, and laser beams LB1 and LB2 parallel to each other are both incident on laser beam emission unit LO. Optical member OC5 is disposed in such a way as to be on both optical paths of laser beam LB2 and laser beam LB1 reflected by mirror M2. Laser beam LB3, which travels between mirror M3 and mirror M5, has an optical axis close to laser beam LB4, which travels between mirror M4 and mirror M5, and laser beams LB3 and LB4 parallel to each other are both incident on mirror M5. Optical member OC6 is disposed in such a way as to be on both optical paths of laser beam LB3 and laser beam LB4, both optical paths lying between mirrors M3, M4 and mirror M5.

As described above, at least two of the plurality of laser beams LB1 to LB4 are subjected to optical axis adjustment inside beam coupler 12A so that optical axes of the at least two laser beams become close and parallel to each other before the at least two laser beams enter condensing lens unit 20, and one optical member is provided, per one set of optical paths of the at least two laser beams, on the optical paths of the at least two laser beams subjected to the optical axis adjustment among the plurality of laser beams LB1 to LB4. Through this process, as shown in FIG. 8, 5 patterns of beam profiles of the coupled laser beam can be created in the same manner as in the configuration of the first exemplary embodiment while patterns of arrangement of optical members are reduced. The patterns of arrangement of optical members are not limited to the above patterns but may be determined to be other patterns. For example, one conceivable pattern, which is not depicted, is to dispose one optical member between laser beam incident unit LI1 and mirror M1 and between mirror M5 and laser beam emission unit LO. In this case, actually created beam profiles of the coupled laser beam are 4 patterns of beam profiles, which are fewer than the beam profiles created in the above case. However, the patterns of arrangement of optical members on the optical paths of laser beams LB1 to LB4 are reduced to 4 patterns, which simplifies control of operations of the optical members.

Other Exemplary Embodiments

The form of positional shift of optical member OC1 indicated in the modification can be applied to optical members OC2 to OC4 of the first exemplary embodiment and to optical members OC5, OC6 of the second exemplary embodiment. Such a case offers the same effect as offered by the second exemplary embodiment. In addition to this case, various constituent elements described in the above exemplary embodiments may be combined together to provide a new exemplary embodiment.

Respective surfaces of optical members OC1 to OC6 may be covered with an antireflection coating for effective use of laser beams. The antireflection coating suppresses unnecessary reflection at each of optical members OC1 to OC6, thus improving efficiency of use of laser beams. This suppresses an increase in power consumption by laser oscillator 10. In the first and second exemplary embodiments including the modification, optical members OC1 to OC6 are provided as parallelly arranged tabular members. Optical members OC1 to OC6, however, may be provided as other types of members, such as prisms.

It may also possible that the initial position of the optical systems of laser oscillator 10 is adjusted in a state in which optical members OC1 to OC6 are arranged on the optical paths of laser beams LB1 to LB4. In this case, the optical paths of laser beams LB1 to LB4 are changed from their initial positions by removing optical members OC1 to OC6 from the optical paths of laser beams LB1 to LB4. In this case, therefore, when the optical paths of laser beams LB1 to LB4 are not changed from their initial positions by no removing optical members OC1 to OC6 from the optical paths of laser beams LB1 to LB4, condensing lens unit 20 guides laser beams LB1 to LB4 to second core 42 of transmission fiber 40. When the optical path of any one of laser beams LB1 to LB4 is changed from its initial position by removing any one of optical members OC1 to OC6 from the optical paths of laser beams LB1 to LB4, in contrast, condensing lens unit 20 guides any one of laser beams LB1 to LB4 that has its optical path changed, to first core 41. In this configuration, the coupled laser beam can be guided to first core 41 only, or to first core 41 and second core 42, or to second core 42 only. The beam profile of the coupled laser beam emitted from transmission fiber 40, therefore, can be changed easily. In the first exemplary embodiment, the core diameter of second core 42 is determined to be 3 times or more the core diameter of first core 41. In the above configuration, however, the size of the core diameter of second core 42 is not limited to this. The above configuration is the configuration in which when the optical paths of laser beams LB1 to LB4 are not changed from their initial positions by removing optical members OC1 to OC6, laser beams LB1 to LB4 are guided to second core 42 of transmission fiber 40. In this configuration, when the optical path of any one of laser beams LB1 to LB4 is changed from its initial position by removing any one of optical members OC1 to OC6, any one of laser beams LB1 to LB4 that has its optical path changed is guided to first core 41. In this configuration, the core diameter of second core 42 may be determined to be smaller than 3 times the core diameter of first core 41.

Respective powers of laser beams LB1 to LB4 output from the plurality of laser modules 11 may be controlled separately. For example, respective powers of laser beams LB1 to LB4 output from the plurality of laser modules 11 may be made different from each other. When a maximum of laser oscillation power output from each of laser modules 11 of this exemplary embodiment is set to 1 kW, a maximum power of the coupled laser beam is 4 kW. Separately controlling laser oscillation power output from each of laser modules 11 renders the maximum power of the coupled laser beam 4 kW or less, but allows a significant increase in patters of beam profiles obtained. As a result, an optimum beam profile can be selected carefully in a desired laser machining process, which leads to an improvement in machining quality.

INDUSTRIAL APPLICABILITY

The laser oscillator and the laser oscillation method according to the present disclosure can change the beam profile of the output coupled laser beam easily in a highly reproductive manner, and are therefore applied usefully to the laser machining device for use in welding, cutting, machining, and the like.

REFERENCE MARKS IN THE DRAWINGS

10 laser oscillator
11 laser module
12 beam coupler
12A beam coupler
20 condensing lens unit (condensing unit)
21 condensing lens
30 laser beam emission head
40 transmission fiber
41 first core
42 second core
43 clad
50 controller
60 power supply
70 housing
100 laser machining device
LB1 laser beam
LB2 laser beam
LB3 laser beam
LB4 laser beam
LI1 laser beam incident unit
LI2 laser beam incident unit
LI3 laser beam incident unit
LI4 laser beam incident unit
LO laser beam emission unit
M1 mirror
M2 mirror
M3 mirror
M4 mirror
M5 mirror
OC1 optical member (optical path changing means)
OC2 optical member (optical path changing means)
OC3 optical member (optical path changing means)
OC4 optical member (optical path changing means)
OC5 optical member (optical path changing means)
OC6 optical member (optical path changing means)

The invention claimed is:

1. A laser oscillator comprising:
a plurality of laser modules that emit a plurality of laser beams, respectively;
a beam coupler that couples the plurality of the laser beams emitted from the plurality of laser modules to form a coupled laser beam, the beam coupler emitting the coupled laser beam; and
a condensing unit having a condensing lens, the condensing unit condensing the coupled laser beam to have a given beam diameter and guiding the condensed coupled laser beam to a transmission fiber,
wherein the beam coupler includes a plurality of optical path changing means each configured to change an optical path of at least one laser beam out of the plurality of laser beams received from the plurality of laser modules,
wherein by changing the optical path of the at least one laser beam by one of the optical path changing means, a beam profile of the coupled laser beam emitted from the transmission fiber is changed without adjusting a position of the condensing lens,
wherein the one of the optical path changing means is disposed to be allowed to move between a first position on the optical path of the at least one laser beam and a second position outside of the optical path of the at least one laser beam, and
wherein at least one of the optical path changing means is configured to subject at least two of the plurality of laser beams to optical axis adjustment inside the beam coupler so that the optical axes of the at least two laser beams become close and parallel to each other before the at least two laser beams enter the condensing unit, the at least one optical path changing means being disposed to be positionable on the optical paths of the at least two laser beams to subject the at least two laser beams to the optical axis adjustment.

2. The laser oscillator according to claim 1,
wherein the transmission fiber at least includes:
a first core that functions as an optical waveguide;
a second core that is in contact with a peripheral surface of the first core and that is coaxial with the first core, the second core functioning as an optical waveguide; and
a clad that is in contact with a peripheral surface of the second core and that is coaxial with the first core and the second core,
wherein each of the plurality of optical path changing means is respectively disposed to be allowed to move between a first position on the optical path of at least one of the plurality of laser beams and a second position outside of the optical path of the at least one of the plurality of laser beams, and
when all of the plurality of optical path changing means are at the second position, the condensing unit guides the coupled laser beams to the first core, or when at least one of the plurality of optical path changing means is moved to the first position such that the optical path of at least one of the plurality of laser beams is changed, the condensing unit guides at least one of the coupled laser beams to the first core and the second core or to the second core.

3. The laser oscillator according to claim 1,
wherein the transmission fiber at least includes:
a first core that functions as an optical waveguide;
a second core that is in contact with a peripheral surface of the first core and that is coaxial with the first core, the second core functioning as an optical waveguide; and
a clad that is in contact with a peripheral surface of the second core and that is coaxial with the first core and the second core,
wherein each of the plurality of optical path changing means is respectively disposed to be allowed to move between a first position on the optical path of at least one of the plurality of laser beams and a second position outside of the optical path of the at least one of the plurality of laser beams, and
when all of the plurality of optical path changing means are at the first position, the condensing unit guides the coupled laser beams to the first core and the second core or to the second core, or when at least one of the plurality of optical path changing means is moved to the second position such that the optical path of at least one of the plurality of laser beams is changed, the condensing unit guides at least one of the coupled laser beams to the first core.

4. The laser oscillator according to claim 1, wherein the one of the optical path changing means is configured to shift the optical path of the at least one laser beam in parallel by a given distance.

5. The laser oscillator according to claim 4, wherein the one of the optical path changing means is a parallelly arranged tabular member that transmits the at least one laser beam.

6. The laser oscillator according to claim 1, wherein the one of the optical path changing means is disposed to make a given angle against the optical path of the at least one laser beam.

7. The laser oscillator according to claim 5, wherein at least one of the optical path changing means is disposed on the optical path of at least one laser beam to make a first angle against the optical path of the at least one laser beam, and is configured to change the optical path of the at least one laser beam by rotating around the optical path by a second angle.

8. The laser oscillator according to claim 1, wherein respective laser oscillation power outputs from the plurality of laser modules are controlled separately.

9. A laser machining device at least comprising:
the laser oscillator according to claim 1;
a laser beam emission head attached to an emission end of the transmission fiber; and
a controller that controls an operation of the optical path changing means.

10. A laser oscillation method carried out by a laser oscillator that is connected to a transmission fiber, the laser oscillator including:
a plurality of laser modules that emit a plurality of laser beams, respectively;
a beam coupler that couples the plurality of the laser beams emitted from the plurality of laser modules to form a coupled laser beam, the beam coupler emitting the coupled laser beam; and
a condensing unit having a condensing lens, the condensing unit condensing the coupled laser beam to have a given beam diameter and guiding the condensed coupled laser beam to a transmission fiber,
wherein the beam coupler includes a plurality of optical path changing means each configured to change an optical path of at least one laser beam out of the plurality of laser beams received from the plurality of laser modules,
wherein one of the optical path changing means is disposed to be allowed to move between a first position on the optical path of the at least one laser beam and a second position outside of the optical path of the at least one laser beam, and
wherein at least one of the optical path changing means is configured to subject at least two of the plurality of laser beams to optical axis adjustment inside the beam coupler so that the optical axes of the at least two laser beams become close and parallel to each other before the at least two laser beams enter the condensing unit, the at least one optical path changing means being disposed to be positionable on the optical paths of the at least two laser beams to subject the at least two laser beams to the optical axis adjustment,
the laser oscillation method comprising:
a beam coupling step of coupling the plurality of laser beams emitted from the plurality of laser modules to form the coupled laser beam with the beam coupler and emitting the coupled laser beam;
a condensing step of condensing the coupled laser beam through the condensing lens into the coupled laser beam with the given beam diameter and guiding the condensed coupled laser beam to the transmission fiber; and
a beam profile changing step of changing, at the beam coupling step, the optical path of at least one laser beam out of the plurality of laser beams received from the plurality of laser modules by at least one of the optical path changing means, and changing a beam profile of the coupled laser beam emitted from the transmission fiber without adjusting a position of the condensing lens.

* * * * *